(12) United States Patent
Luo et al.

(10) Patent No.: US 12,504,037 B2
(45) Date of Patent: Dec. 23, 2025

(54) MODULAR SUCTION CUP DEVICE AND PHOTOGRAPHY DEVICE

(71) Applicant: TILTA INC., Burbank, CA (US)

(72) Inventors: Yaolong Luo, Shenzhen (CN);
Wenping Zeng, Shenzhen (CN);
Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 0 days.

(21) Appl. No.: 18/459,269

(22) Filed: Aug. 31, 2023

(65) Prior Publication Data

US 2024/0401635 A1 Dec. 5, 2024

(30) Foreign Application Priority Data

May 30, 2023 (CN) .......................... 202321357738.4

(51) Int. Cl.
*F16B 47/00* (2006.01)
*G03B 17/56* (2021.01)

(52) U.S. Cl.
CPC ............ *F16B 47/00* (2013.01); *G03B 17/561* (2013.01); *F16B 2200/83* (2023.08)

(58) Field of Classification Search
CPC ..... F16B 47/00; F16B 2200/83; G03B 17/561
USPC ............ 248/363, 205.5, 205.8, 206.2, 206.3
See application file for complete search history.

(56) References Cited

U.S. PATENT DOCUMENTS

| | | | |
|---|---|---|---|
| 3,970,341 A * | 7/1976 | Glanemann | B66C 1/0293 294/186 |
| 5,516,019 A * | 5/1996 | Moon | B60R 9/058 248/205.8 |
| 10,030,690 B2 * | 7/2018 | Liu | G08B 5/22 |
| 11,346,389 B2 * | 5/2022 | Chen | F16B 47/00 |
| 11,845,181 B1 * | 12/2023 | Atamer | B25J 15/0052 |
| 11,988,245 B1 * | 5/2024 | Lin | F16B 47/006 |
| 12,078,257 B2 * | 9/2024 | Zimmerman | F16B 47/00 |
| 2004/0211867 A1 * | 10/2004 | Doyle | F16B 47/00 248/205.5 |
| 2006/0231705 A1 * | 10/2006 | Liu | F16B 47/00 248/205.5 |
| 2007/0023594 A1 * | 2/2007 | Choi | F16B 47/00 248/205.5 |
| 2014/0084118 A1 * | 3/2014 | Tooley | F16B 11/00 248/205.3 |
| 2014/0197288 A1 * | 7/2014 | Yang | F16B 47/006 248/205.9 |

(Continued)

FOREIGN PATENT DOCUMENTS

CN 209671395 U 11/2019

*Primary Examiner* — Muhammad Ijaz
(74) *Attorney, Agent, or Firm* — LOZA & LOZA, LLP; Derek Yeung

(57) ABSTRACT

A modular suction cup device comprises a suction cup body and an air control system module for regulating the adhesion of the suction cup body. The suction cup body includes an absorption chamber for adhering to an external structure or surface on one side of the absorption chamber, while the air control system module is detachably installed on the suction cup body and connected to the absorption chamber. In the present disclosure, the modular design of the air control system module and its detachable connection to the suction cup body enhance the convenience of installation and removal, particularly during maintenance or replacement operations.

9 Claims, 8 Drawing Sheets

(56) References Cited

U.S. PATENT DOCUMENTS

| | | | | |
|---|---|---|---|---|
| 2015/0078737 A1* | 3/2015 | Albonico | ............. | G03B 19/026 |
| | | | | 396/48 |
| 2015/0275943 A1* | 10/2015 | Chang | ................. | F16M 13/022 |
| | | | | 248/205.8 |
| 2015/0306622 A1* | 10/2015 | Ashworth | ............ | F16M 13/022 |
| | | | | 248/205.8 |
| 2021/0181609 A1* | 6/2021 | Grinnell | .................... | A45F 5/02 |
| 2021/0341011 A1* | 11/2021 | Brenner | ................. | F16B 45/00 |
| 2022/0170503 A1* | 6/2022 | Bleckat | ................... | F16B 47/00 |
| 2022/0186770 A1* | 6/2022 | Zhu | ........................ | F16B 21/09 |
| 2024/0091960 A1* | 3/2024 | Liao | ........................ | F16B 47/00 |
| 2024/0102510 A1* | 3/2024 | Woo | ........................ | F16B 47/00 |
| 2024/0401635 A1* | 12/2024 | Luo | ..................... | G03B 17/561 |

* cited by examiner

MODULAR SUCTION CUP DEVICE AND PHOTOGRAPHY DEVICE

CROSS-REFERENCE TO RELATED APPLICATIONS

The present Application for Patent claims priority to and the benefit of pending Chinese Patent Application No. 202321357738.4, filed May 30, 2023, and hereby expressly incorporated by reference herein as if fully set forth below in its entirety and for all applicable purposes.

TECHNICAL FIELD

The present disclosure relates to the technical field of suction devices, in particular to a suction cup structure and a photography device.

INTRODUCTION

Suction devices (e.g., suction cup) are commonly used to securely attach objects by adhesion (e.g., suction) to a desired position. Some devices incorporate suction cup functionality to achieve quick installation and fixation. Electric suction cups are often employed to enhance the adhesion effect. However, existing electric suction cups typically feature a decentralized arrangement of the air control system responsible for regulating suction cup adhesion. This decentralized arrangement presents challenges when it comes to repair, replacement, and adaptation to different usage scenarios.

For instance, a prior Chinese patent application (CN202223415413.5) discloses an electric suction cup bracket comprising a housing, a suction cup at one end of the housing, a cylinder within the housing, a first button in the middle of the suction cup, a circuit board within the housing, and a driving mechanism connected to the circuit board. The housing includes an air chamber, and the cylinder incorporates a first piston rod. The driving mechanism is connected to the first piston rod, and the air chamber communicates with the interior of the cylinder and the suction cup. The first button interacts with the circuit board to activate the driving mechanism and move the first piston rod within the cylinder, thereby extracting air from the air chamber and the suction cup. However, the decentralized arrangement of the air control system within the housing of this electric suction cup bracket hampers maintenance, replacement, and adaptation to different usage scenarios.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

To address the aforementioned issues, an objective of the present disclosure is to provide a modular suction cup device that modularizes the air control system, enabling easy disassembly, installation, maintenance, and replacement.

Another objective of the present disclosure is to present a photography device that employs a suction cup for support and installation, with enhanced convenience in terms of disassembly, installation, and maintenance.

To achieve the above objectives, the technical solution of the present disclosure is as follows:

A modular suction cup device comprising a suction cup body and a modular air control system module. The air control system module, designed in a modular structure, is detachably installed on the suction cup body rather than being directly fixed inside the suction cup. It serves to regulate the adsorption of the suction cup body.

Moreover, the air control system module may include a module body and an air control system. The module body acts as the outer shell of the air control system module, accommodating the air control system. This modular structure facilitates easy disassembly and installation of the air control system module onto the suction cup body. Once installed on the suction cup body, the air control system can establish a connection with the suction cup body to regulate its adsorption.

Furthermore, the air control system module may feature a connecting bracket with a containment chamber. The module body can be installed within the containment chamber of the connecting bracket. The connecting bracket is detachably mounted on the suction cup body, thereby connecting the module body and the air control system inside the module body to the suction cup body.

Additionally, a magnetic suction piece can be incorporated into the suction cup body.

Furthermore, a filter element for filtration purposes can be provided at the connection between the suction cup body and the air control system.

A photography device is also provided, comprising a photography device body and the modular suction cup device. The photography device body is securely connected to either the suction cup body or the air control system module.

The advantageous effect of the present disclosure lies in the modular suction cup device, where the modular design of the air control system module and its detachable connection to the suction cup body ensure convenient disassembly and maintenance of the air control system module when maintenance or replacement is required.

BRIEF DESCRIPTION OF THE DRAWINGS

In order to more clearly illustrate aspects of the present disclosure or the technical schemes in the prior art, the drawings used in the description of exemplary embodiments will be briefly introduced below. Obviously, the drawings in the following description are only examples of the present disclosure. For those ordinarily skilled in the art, other implementations can be obtained according to the structures shown in these drawings.

DETAILED DESCRIPTION

Figure 1:
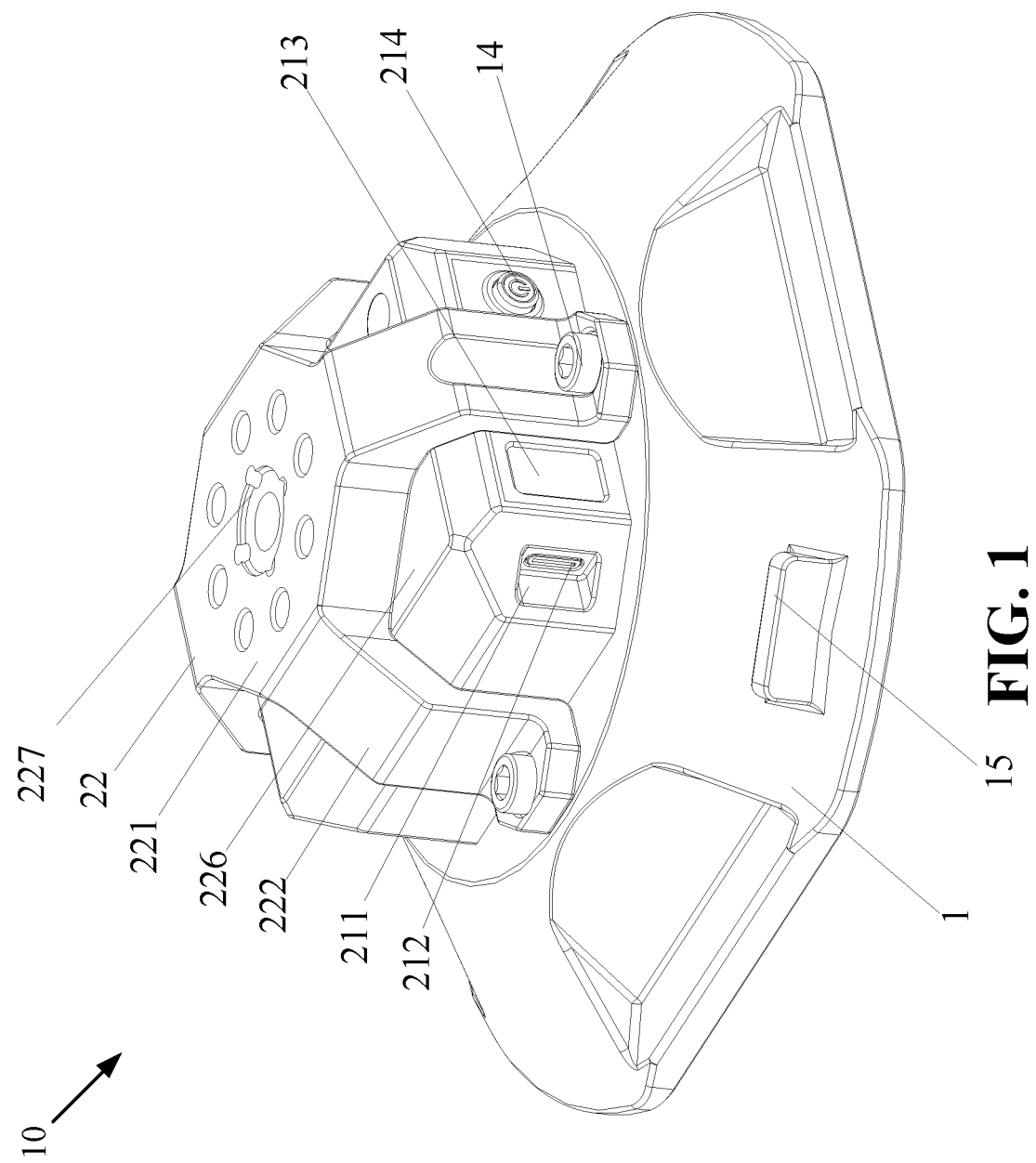
FIG. 1 is a schematic diagram of a modular suction cup device in a first perspective view according to an embodiment of the present disclosure.
Figure 2:
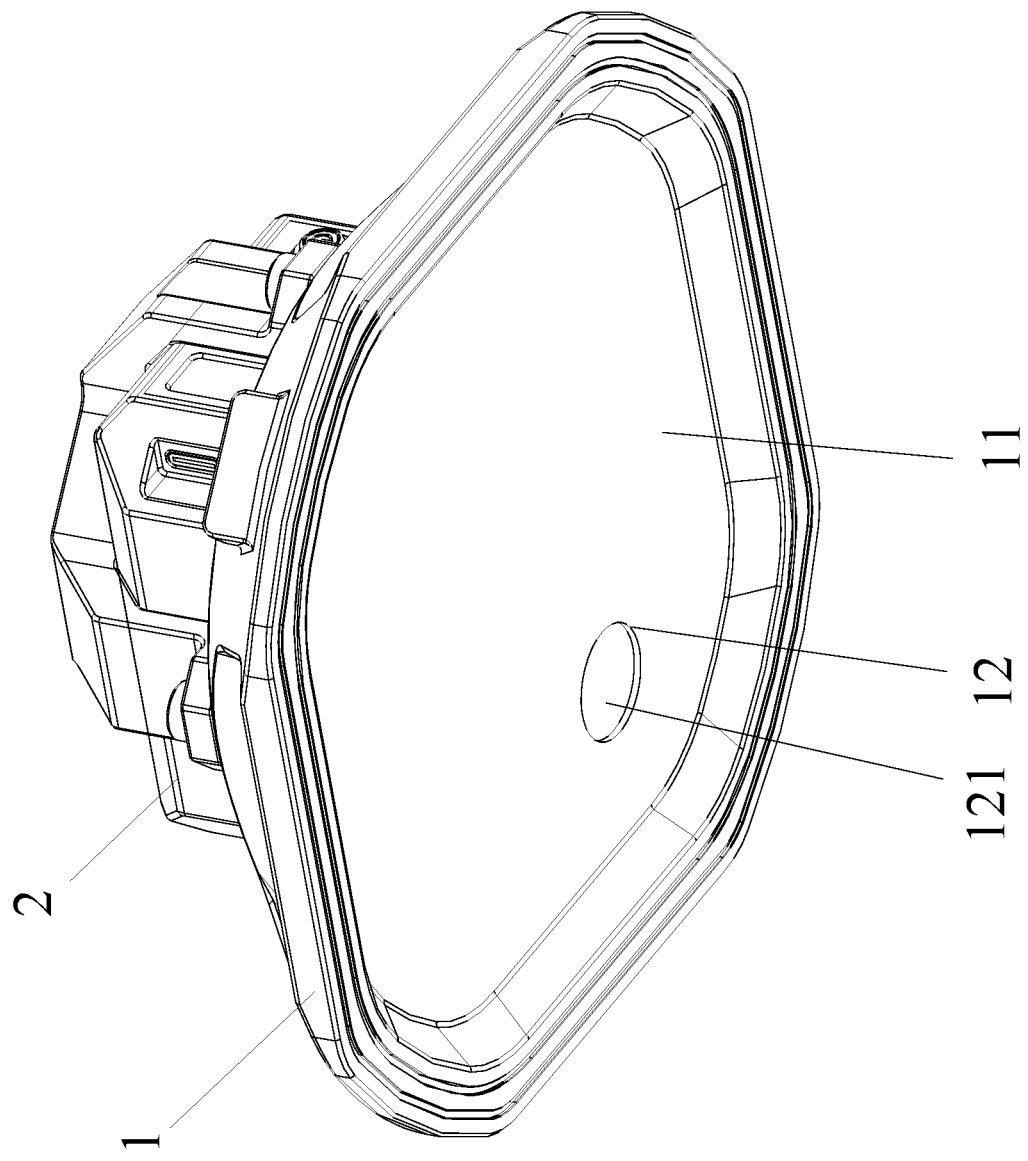
FIG. 2 is a schematic diagram of the modular suction cup device in a second perspective view.
Figure 3:
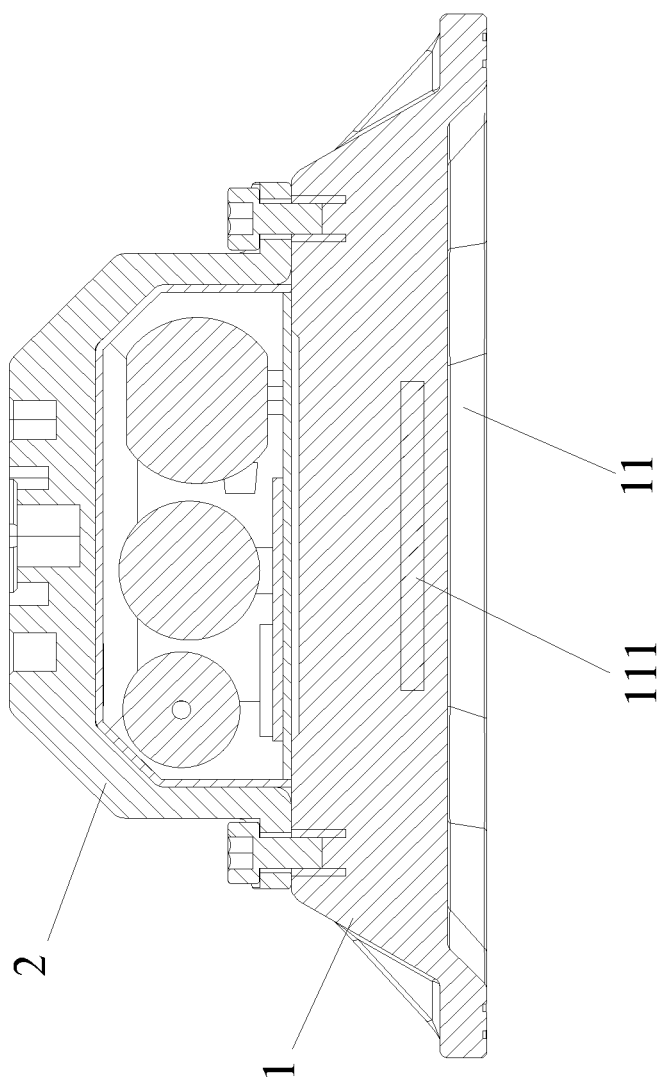
FIG. 3 is a cross-sectional view of the modular suction cup device.

To further elucidate the purpose, technical solution, and advantages of the present disclosure, specific embodiments will be described in detail below, in conjunction with the accompanying drawings. It should be understood that these specific embodiments are solely intended to illustrate the present disclosure, and not to limit its scope.

Referring to FIGS. 1-5, in one embodiment, a modular suction cup device (10) is provided. The suction cup device comprises a suction cup body (1) and a modular air control system module (2) for regulating the adsorption or suction of the suction cup body (1). The suction cup body (1) is equipped with an absorption chamber (11) for adhering to an external structure or surface, for example using suction. The air control system module (2) is detachably installed on the suction cup body (1) and is in communication (pneumatic communication) with the absorption chamber (11). The modular design of the air control system module and its detachable connection to the suction cup body facilitate convenient disassembly and maintenance of the air control system module when required. This arrangement simplifies the disassembly and installation of the suction cup body (1) and the air control system module (2).

In this embodiment, the air control system module (2) comprises a module body and an air control system responsible for regulating the adsorption or suction of the suction cup body (1). The air control system is housed within the module body, which is detachably installed on the suction cup body (1) on the side opposite to the absorption chamber (e.g., suction cup). The suction cup body (1) is also provided with an air extraction port (12) on its other side, which is in communication with the bottom wall of the absorption chamber (11). The air control system is connected (hermetically connected) to the air extraction port (12) and can evacuate the space (i.e., exhaust the air therein) between the suction cup body (1) and the object (or a surface thereof) being adhered to through the air extraction port (12), allowing the suction cup body to adhere to the object.

Figure 6:
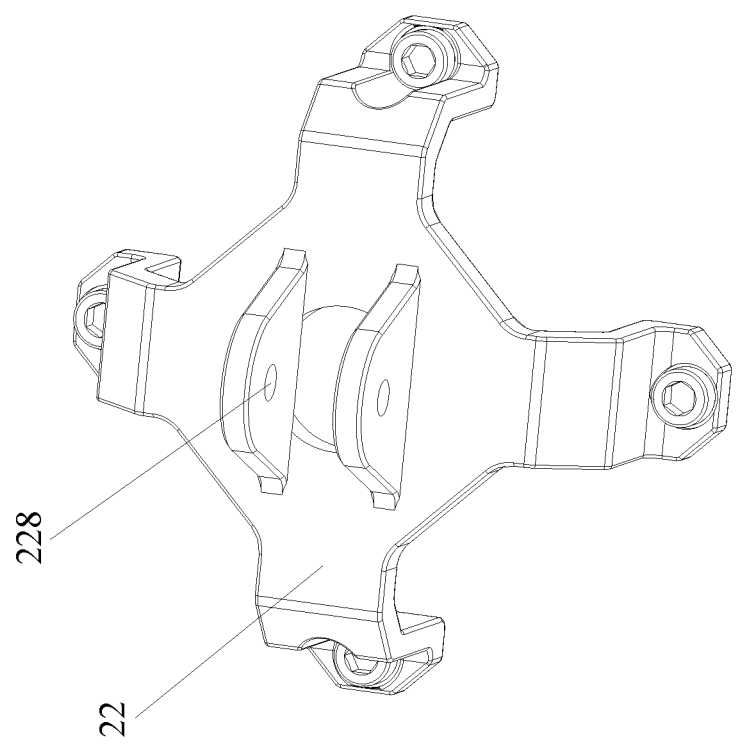
FIG. 6 is a schematic diagram of an embodiment of a connecting bracket of the modular suction cup device.
Figure 7:
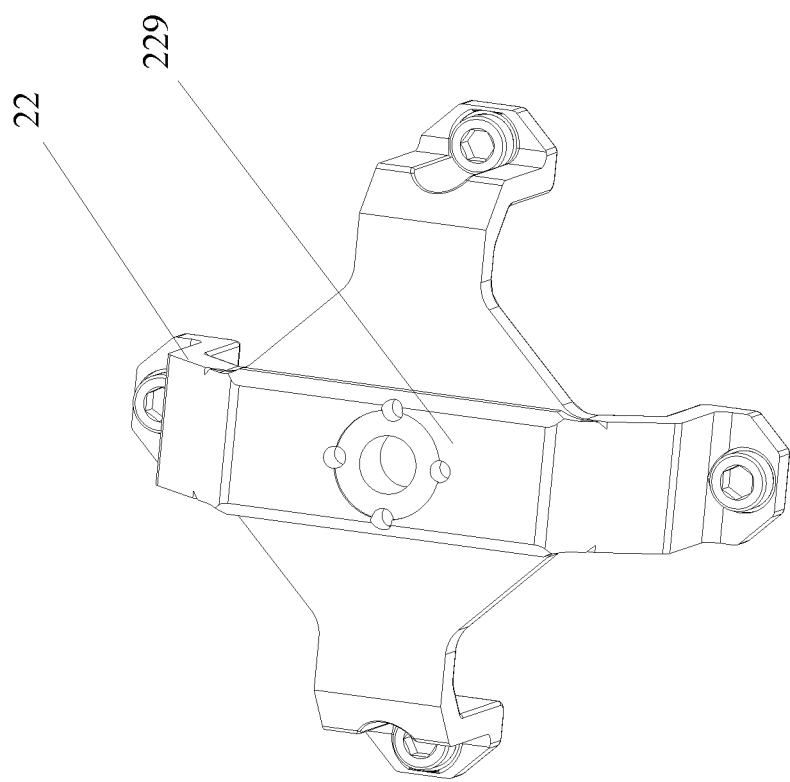
FIG. 7 is a schematic diagram of another embodiment of the connecting bracket.

In this embodiment, the module body of the air control system module (2) further comprises a housing (21) and a connecting bracket (22). Two exemplary connecting brackets are shown in FIGS. 6 and 7, respectively. In some aspects, the connecting bracket (22) consists of a bracket body (221) (also called as a support body) and multiple connectors (222) connected to the bracket body. Each connector (222) is connected to one end of the bracket body (221), forming a containment chamber (223) by the bracket body (221) and the multiple connectors (222). The housing (21) can be detachably installed within the containment chamber (223), and the other end of each connector (222) is detachably connected to the other side of the suction cup body (1). In one example, four connectors (222) are used, with one end of each connector bent and fixed (or attached) to the bracket body (221). This bent and fixed arrangement allows for a larger volume of the containment chamber (223), accommodating a larger housing (21). The combination of the connecting bracket (22) and the housing (21) facilitates the disassembly and installation of the air control system module (2). During installation, specifically, the connecting bracket (22) is connected to the suction cup body (1), and the housing (21) can be securely fixed. During disassembly, the connecting bracket (22) and the suction cup body (1) can be separated, and the housing (21) can be detached as well.

In this embodiment, multiple connection positions (13) (e.g., see FIG. 4) are provided on the other side of the suction cup body (1), and the other end of each connector (222) is detachably installed on a corresponding connection position (13). In one example, the multiple connection positions (13) can be symmetrically arranged on the other side of the suction cup body (1). This arrangement enables the housing (21) to be fixed at the center position of the suction cup body, ensuring even distribution of pressure from the air control system module throughout the suction cup body (1) and enhancing structural stability.

Figure 4:
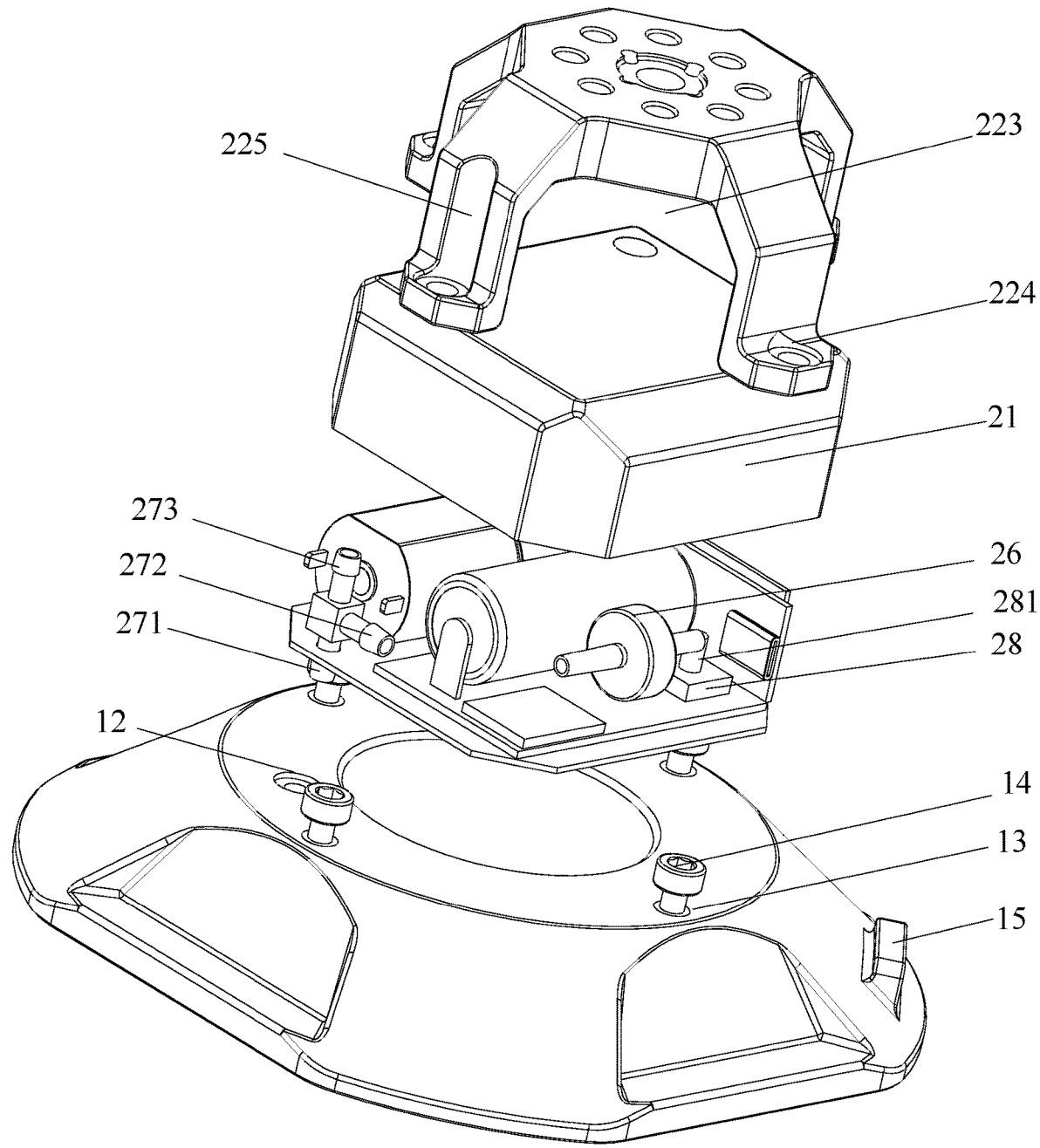
FIG. 4 is an exploded view of the modular suction cup device.
Figure 5:
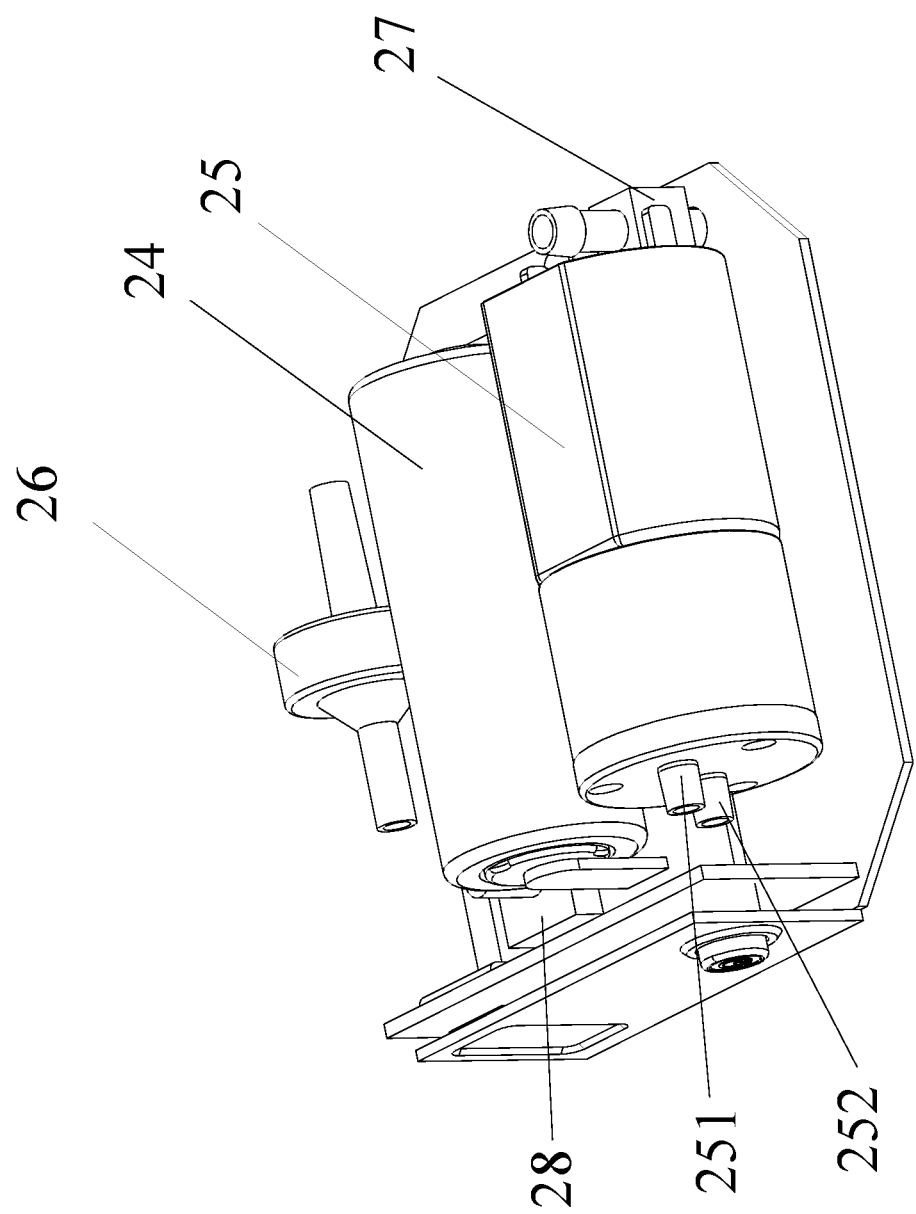
FIG. 5 is a schematic diagram of an air control system of the modular suction cup device.

In this embodiment, each connector (222) has one end away from the bracket body (221) bent to form a connecting portion (224) (e.g., see FIG. 4). The connecting portion (224) at the other end of each connector (222) is detachably connected to the corresponding connection position (13), for example, using a locking member (14). A pair of symmetric connectors (222) (e.g., two connectors on opposite sides of the bracket body) can each possess a first clearance groove (225) that connects to the connecting portion (224), and this groove (225) matches (e.g., sized to accommodate) the locking member (14). In one example, the locking member (14) can be a screw or a fastener. The first clearance grooves (225) allow two screws to detachably secure the connecting portions (224) to their corresponding connection positions (13) on the suction cup body (1) during installation, thereby providing positioning for the other connectors to be locked onto their respective connection positions (13).

In one embodiment, a magnetic suction piece (111) can be fixedly arranged within the absorption chamber (11). The magnetic suction piece (111) is a magnet used to assist in adsorbing objects with magnetic properties, thereby providing dual security.

In one embodiment, a filter element (121) can be provided at the air extraction port (12). The filter element (121) can be a dustproof pad, which is placed at the air extraction port to prevent dust from entering the air control system module during the suction process, thereby significantly extending the service life of the components.

In one embodiment, a disassembly structure (15) can be firmly positioned on the side of the suction cup body (1) to facilitate its disassembly.

In one example, the disassembly structure (15) may take the form of a protrusion that elevates one side of the suction cup body (1) for easy disassembly, or an air valve that controls the air pressure between the suction cup body and the adhered object/surface, enabling disassembly of the suction cup body from the object/surface.

In one embodiment, a clearance gap (226) is formed between adjacent connectors (222), and the housing (21) corresponds to a second clearance groove (211) located at the clearance gap (226). The second clearance groove (211) features a power interface (212) for power supply or charging purposes.

In one embodiment, the air control system (2) comprises a circuit board, a battery (24), and an air control component. The air control component, power interface (212), and battery are electrically interconnected with the circuit board. The power interface (212) serves as a charging interface for the battery (24). Housed within the housing (21), the circuit board, battery (24), and air control component are connected (e.g., hermetically connected) to the air extraction port (12). Alternatively, in another embodiment, a battery may be excluded, and the power interface directly connects to an external power source to supply power to the air control system. The circuit board and its circuit design follow conventional practices.

In one embodiment, the air control component comprises a vacuum pump (25), a one-way valve (26), and an exhaust pipe (27). The vacuum pump (25) and one-way valve (26) are situated inside the housing (21). The vacuum pump (25) possesses an exhaust port (251) and an intake port (252). The exhaust pipe (27) comprises a first pipe end (271) inserted into the air extraction port (12) and a second pipe end (272) connected to one end of the one-way valve (26) (e.g., using a tube). The other end of the one-way valve (26) connects to the intake port (252) of the vacuum pump (25) (e.g., using a tube). When the absorption chamber (11) of the suction cup body (1) approaches the adhered object (or a surface thereof), the vacuum pump (25) initiates, causing the air between the suction cup body (1) and the object to be absorbed into (or exhausted by) the vacuum pump (25) through the first pipe end (271), second pipe end (272), and one-way valve (26), and then released through the exhaust port (251).

In one embodiment, the air control component also includes a monitoring module (28) arranged on the circuit board, featuring a monitoring port (281). The exhaust pipe (27) can incorporate a third pipe end (273) connecting the first pipe end (271) and second pipe end (272). The third pipe end (273) can be linked to the monitoring port (281) via a hose or tube, allowing for the monitoring of air pressure between the suction cup body (1) and the adhered object/surface. This configuration ensures that when the pressure value drops below the predefined threshold (e.g., safety threshold), the vacuum pump (25) can continue to exhaust to maintain the pressure value above the desired threshold. The aforementioned pipe ends are interconnected through suitable pipes, hoses, or tubes.

In one embodiment, the air control system module can be equipped with a display screen (213) and one or more buttons (214), which are electrically connected to the circuit board and installed on the housing (21). The display screen (213) can provide information (e.g. real-time visualization) of the air pressure within the suction cup body (1), while the buttons (214) can enable various functions, for example, one-touch initiation of the suction process of the suction cup body (1).

In one embodiment, the air control system module can incorporate a wireless connection module to establish real-time connectivity with a mobile app, enabling the monitoring of the suction cup's status. An automatic alarm can be triggered when the negative pressure value falls below the desired threshold (e.g., safety threshold).

Figure 8:
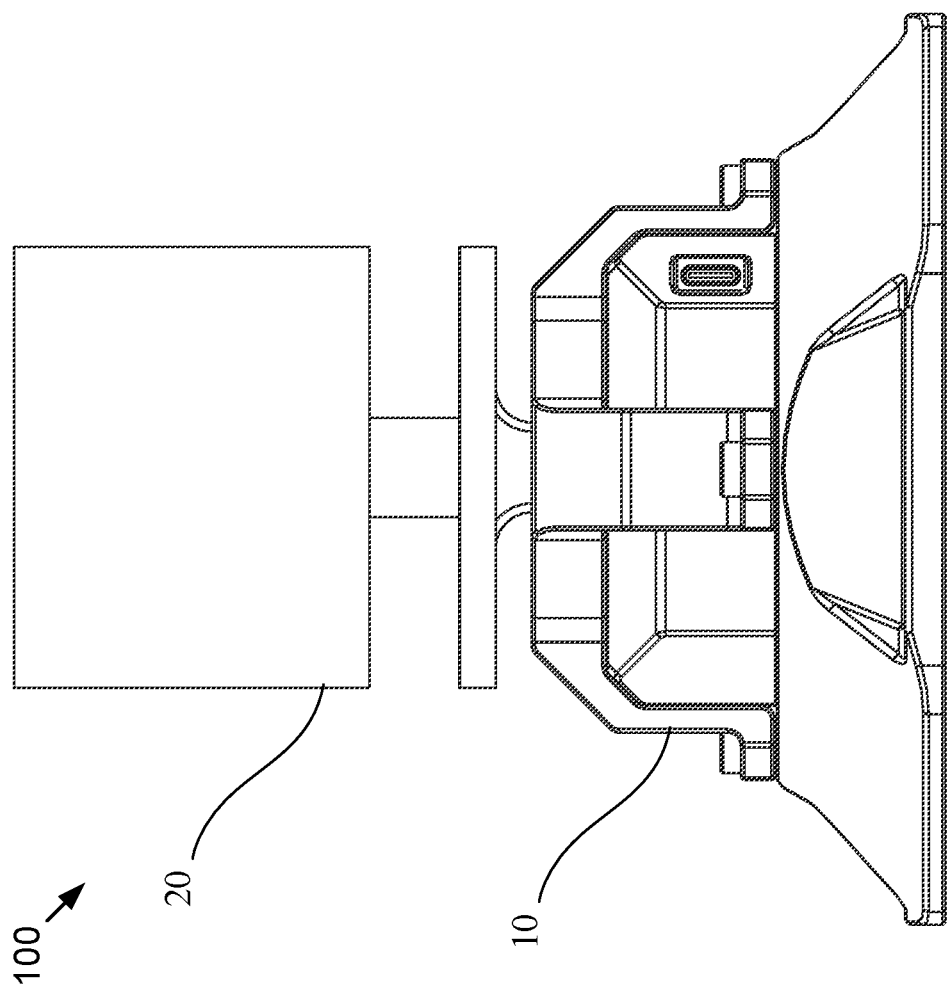
FIG. 8 is a schematic diagram of a photography device connected to the modular suction cup device according to an embodiment.

In one embodiment, referring to FIG. 8, a photographic device (100) can include a photographic device body (20) (e.g., a camera) and a modular suction cup device (10). For example, the photographic device body can be firmly connected to the air control system module (2).

Depending on the specific photographic device bodies, different interfaces can be implemented on the air control system module (2). Referring to FIG. 1, in the first embodiment of the connection bracket, a positioning hole (227) is provided on one side of the air control system module (2), away from the suction cup body (1). In one example, the positioning hole can be an Arca-Swiss positioning hole or another suitable type, allowing the installation of a photographic accessory with a corresponding interface onto the air control system module using screws or suitable fasteners.

Referring to FIG. 6, in the second embodiment of the connection bracket, two spaced-apart connecting protrusions (228) are present on one side of the air control system module (2), away from the suction cup body (1). These connecting protrusions feature threaded holes, forming a quick-release interface. A photographic device body with a matching interface can slide into the space between the two connecting protrusions (228) and be secured using screws or suitable fasteners.

Referring to FIG. 7, in the third embodiment of the connection bracket, a slide rail (229) is situated on one side of the air control system module (2), away from the suction cup body (1). The slide rail (229) can include positioning holes such as Arca-Swiss positioning holes or other suitable types. A photographic device body with an interface compatible with the slide groove can slide and connect to the slide rail, subsequently being locked into the positioning holes.

The above description represents exemplary embodiments of the present disclosure and should not be construed as limiting the scope thereof. Any modifications, equivalent replacements, or improvements made within the spirit and principles of the present disclosure should be included within its scope.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, processes, operations, elements, and/or components, but do not preclude the presence or addition of one or more other features, integers, processes, operations, elements, components, and/or groups thereof.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A modular suction cup device comprising:
   a suction cup body comprising an absorption chamber configured to adhere to an external structure;
   a housing on the suction cup body;
   a connecting bracket on the housing and comprising a support body and a plurality of connectors connected to respective sides of the support body, the housing located in a containment chamber formed by the support body and the plurality of connectors, wherein each of the respective sides of the support body is connected to a first end of a different connector among the plurality of connectors; and an air control system module in the housing, the air control system module being configured to control an adhesion generated by the suction cup body, wherein the air control system module is installed on the suction cup body and connected to the absorption chamber, wherein the suction cup body comprises a plurality of connection positions, and a second end of each of the plurality of connectors is detachably installed on a corresponding one of the plurality of connection positions, and wherein the plurality of connection positions are symmetrically arranged on the suction cup body, and the housing is positioned at a center of a side of the suction cup body, opposite to the absorption chamber.

2. The modular suction cup device as claimed in claim 1, wherein the air control system module comprises:

an air control system configured to regulate the adhesion generated by the suction cup body, the air control system being housed within the housing, which is installed on a first side of the suction cup body, opposite to the absorption chamber, a bottom wall of the absorption chamber featuring an air extraction port that communicates with the absorption chamber, and the air control system being hermetically connected to the air extraction port.

3. The modular suction cup device as claimed in claim 2, further comprising a filter at the air extraction port.

4. The modular suction cup device as claimed in claim 2, wherein each of the plurality of connectors is bent at one end away from the support body to form a connecting portion, and the connecting portion is detachably connected to a corresponding one of the plurality of connection positions using a locking member.

5. The modular suction cup device as claimed in claim 2, wherein one or more of the plurality of connectors comprises a first clearance groove, and wherein the housing comprises a second clearance groove, and the second clearance groove is equipped with a power interface for supplying power to the modular suction cup device.

6. The modular suction cup device as claimed in claim 1, further comprising a magnetic suction piece arranged inside the absorption chamber.

7. The modular suction cup device as claimed in claim 1, further comprising a disassembly structure fixedly arranged on a side of the suction cup body, wherein the disassembly structure is configured to facilitate disassembly of the suction cup body.

8. A photography device comprising a photography device body and the modular suction cup device as claimed in claim 1, wherein the photography device body is connected to the air control system module.

9. The modular suction cup device as claimed in claim 1, wherein the support body comprises an interface configured to secure a photographic device.

* * * * *